United States Patent Office 3,420,845
Patented Jan. 7, 1969

3,420,845
PYRROLE-2-CARBOXAMIDO AMIDINES
Federico Arcamone, Sergio Penco, and Vincenzo Nicolella, Milan, Italy, assignors to Società Farmaceutici Italia, Milan, Italy, a corporation of Italy
No Drawing. Filed July 7, 1965, Ser. No. 470,258
Claims priority, application Italy, July 14, 1964, 15,390/64
U.S. Cl. 260—326.3
Int. Cl. C07d 27/74
7 Claims Our invention relates to new pyrrole derivatives having antiviral activity and to the process for preparing them. In our copending application Ser. No. 384,515 filed on July 22, 1964, we described and claimed new pyrrole compounds having the formula:

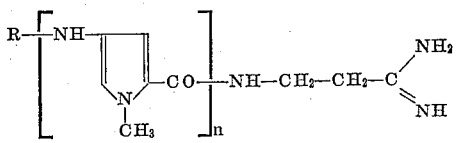

wherein $n=2$ or 3 and R is H or the acyl residue of an organic aliphatic, cycloaliphatic or aromatic acid with 1 to 10 carbon atoms, their non-toxic organic and inorganic acid addition salts and a process for their preparation.

The above compounds have proved useful in agriculture and in therapy as anti-fungal, tripanocidal, antiprotozoal, bactericidal and antiviral. Any pertinent portions are incorporated herein by reference.

We have found that other new pyrrole derivatives of the formula:

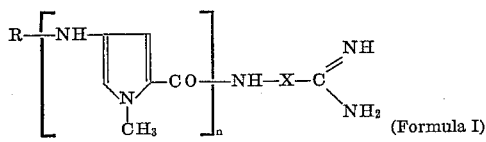

wherein:
when $n=2$ or 3, X is taken from the group consisting of

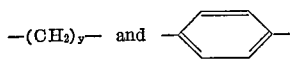

$y$ is taken from the group consisting of 1, 3, 4, 5 and 6;
when $n=4$, 5 and 6, X is taken from the group consisting of

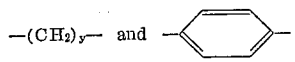

$y$ is taken from the group consisting of 1, 2, 3, 4, 5 and 6;
R=H and —CHO are usefully employed in veterinary therapy as antiviral, antiprotozoal, antihelmintic agents.

The starting materials for the preparation of the new compounds of the invention are pyrrole derivatives of the formula:

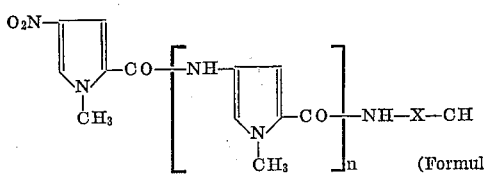

wherein:
when $n=1$ or 2, X is taken from the group consisting of

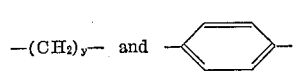

$y$ is taken from the group consisting of 1, 3, 4, 5 and 6;
when $n=3$, 4 and 5, X is taken from the group consisting of

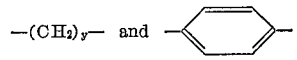

$y$ is taken from the group consisting of 1, 2, 3, 4, 5 and 6.

The starting materials may be prepared as follows: 1-methyl-4-nitro-pyrrole-2-carboxylic acid, which is known in the literature, is converted into its chloride by treatment with thionyl chloride and then condensed with a compound having the formula $H_2N$—X—CN (wherein X has the above meaning) to give 1-methyl-4-nitro-pyrrole-2-carboxamido-alkylene (or benzo-)-nitrile. This is then catalytically hydrogenated to 1-methyl-4-amino-pyrrole-2-carboxamido-alkylene (or benzo-)-nitrile, which in turn is condensed with the 1-methyl-4-nitro-pyrrole-2-carboxylic acid chloride to give 1-methyl-4(1-methyl-4-nitro-pyrrole-2-carboxamido)-pyrrole - 2 - carboxamido-alkylene (or benzo-)-nitrile. This last compound is hydrogenated to 1-methyl-4-(1-methyl-4-amino-pyrrole - 2 - carboxamido)-pyrrole-2-carboxamido - alkylene (or benzo-)-nitrile and then condensed with 1-methyl-4-nitro-pyrrole-2-carboxylic acid chloride to give the desired starting material (Formula II, wherein $n=2$ and X and Y have the above mentioned meaning). In the same manner, other molecules of 1-methyl-4-nitro-pyrrole-2-carboxylic acid may be condensed to give other starting materials having the general Formula II (wherein $n=3$, 4 and 5).

According to the process of the invention, the starting material having the Formula II is reacted with a lower anhydrous aliphatic alcohol, such as methanol and ethanol, in the presence of gaseous anhydrous hydrogen chloride, at a temperature of about 0° C. When the reaction is completed, the solvents are evaporated off and a residue is obtained wherein the corresponding imino-ether hydrochloride, having the formula below, is present:

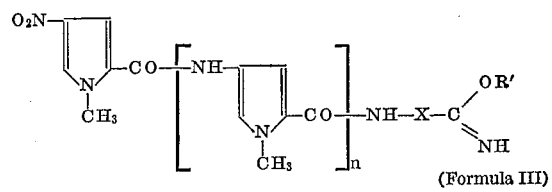

wherein:
when $n=1$ or 2, X is taken from the group consisting of

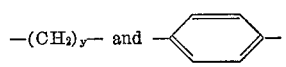

$y$ is taken from the group consisting of 1, 3, 4, 5 and 6;
when $n=3$, 4 and 5, X is taken from the group consisting of

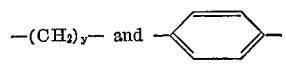

$y$ is taken from the group consisting of 1, 2, 3, 4, and 6; and
R′=lower alkyl.

The pure or crude imino-ether hydrochloride having the Formula III, is reacted with anhydrous gaseous ammonia in an anhydrous lower aliphatic alcohol, such as methanol or ethanol, at a temperature of about 0° C. The reaction is preferably completed at room temperature. The product, separated from the reaction mass as the corresponding amidine hydrochloride, has the formula:

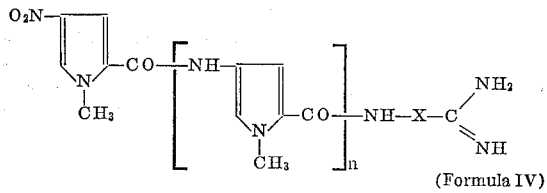

(Formula IV)

wherein $n$ and $X$ have the above meaning.

The amidine hydrochloride, having the structural Formula IV, dissolved or suspended in a solvent taken from the group consisting of water, anhydrous or diluted acetic acid, lower aliphatic alcohol, such as methanol or ethanol, is hydrogenated at room temperature and under atmospheric pressure in the presence of a catalyst, taken from the group consisting of 5%–10% palladium on charcoal and platinum dioxide. The conversion of the CN (cyanide) group into amidine group may also be effected before the reduction of the nitro group, followed by the condensation with 1-methyl-4-nitro-pyrrole-2-carboxylic acid chloride to obtain the compound having the desired pyrrole chain. The resulting product having the Formula I (wherein R=H, X, $n$ have the above meaning) may be separated either as free base or its salt, or optionally acylated with the mixed anhydride of formic and acetic acid optionally in the presence of a tertiary amine, such as pyridine, triethylamine or dimethylaniline.

The end products having the Formula I may be converted by conventional techniques into the corresponding non-toxic organic or inorganic acid addition salts, such as hydrochlorides, sulfates, phosphates, acetates, maleates, ascorbates, succinates, benzoates, salicylates. Typical products which are obtained are:

1-methyl-4[1-methyl-4(1-methyl-4-amino-pyrrole - 2 - carboxamido)-pyrrole-2 - carboxamido]-pyrrole-2-carboxamidoacetamidine;

p-{1-methyl - 4 - [1-methyl-4-(1-methyl-4-aminopyrrole-2-carboxamido)-pyrrole-2-carboxamido]-pyrrole - 2 - carboxamido}-benzoamidine;

β-{{1-methyl-4-{1-methyl-4[1 - methyl-4-(1-methyl-4-amino-pyrrole - 2 - carboxamido)-pyrrole-2-carboxamido]-pyrrole-2-carboxamido}-pyrrole - 2-carboxamido}}-propionamidine;

γ-{1-methyl-4-[1-methyl-4(1-methyl - 4 - aminopyrrole-2-carboxamido) - pyrrole-2-carboxamido]-pyrrole-2 - carboxamido}-butyramidine;

ƒ-{1-methyl-4[1-methyl-4(1-methyl-4-amino-pyrrole-2-carboxamido)-pyrrole-2 - carboxamido]-pyrrole-2-carboxamido}-heptanoylamidine;

p-{{{1-methyl-4-{{1-methyl-4-{1-methyl-4-[1-methyl-4-(1-methyl-4-aminopyrrole-2-carboxamido)pyrrole - 2 - carboxamido]pyrrole - 2 - carboxamido}pyrrole-2-carboxamido}pyrrole-2-carboxamido}}-pyrrole - 2 - carboxamido}}}benzoamidine hydrochloride;

β-{{{{1 - methyl-4-{{{1-methyl-4-{{1-methyl-4-{1-methyl-4[1-methyl-4(1-methyl-4-amino-pyrrole-2 - carboxamido)pyrrole-2-carboxamido]-pyrrole - 2 - carboxamido}-pyrrole-2-carboxamido}}-pyrrole - 2 - carboxamido}}}-pyrrole-2-carboxamido}}}}propionamidine their 4-formyl-derivatives and their salts with non-toxic organic and inorganic acids (Formula I, R=CHO).

The new compounds of the invention show a good antiviral, antiprotozoal and antihelmintic activity.

The pharmaceutical compositions of the invention comprise one or more of the new products of the invention with a therapeutically acceptable solid or liquid vehicle, according to the manner of administration.

The following examples are to illustrate the invention without limiting it.

EXAMPLE 1 p-{1 - methyl-4-[1-methyl - 4(1-methyl-4-formylamino-pyrrole-2-carboxamido)-pyrrole-2-carboxamido] - pyrrole-2-carboxamido}-benzoamidine hydrochloride To a solution of 6 g. of p-aminobenzonitrile in 150 cc. of benzene, 6.7 g. of sodium bicarbonate, in 50 cc. of water and 9.4 g. of 1-methyl-4-nitropyrrole-2-carboxylic acid hydrochloride in 60 cc. of benzene, are added. Stirring is maintained for one night at room temperature, then the precipitate, consisting of p-(1-methyl-4-nitro-pyrrole-2-carboxamido)-benzonitrile is filtered off and washed with benzene. By recrystallization from dimethylformamide, 12.5 g. of the compound which still does not melt at 330° C. is obtained.

5 g. of this last compound, in 70 cc. of dimethylformamide, are hydrogenated under atamospheric pressure and at room temperature in the presence of 2 g. of 10% palladium on charcoal. The solution filtered off from the catalyst is diluted about four times with water, mixed with 2 g. of sodium bicarbonate and with a benzene solution of 1-methyl-4-nitropyrrole-2-carboxylic acid chloride (3.8 g. in 100 cc. of benzene). Stirring is maintained for one night at room temperature. The precipitate, consisting of p-[1 - methyl-4-(1 - methyl-4-nitropyrrole-2-carboxamido) pyrrole-2-carboxamido]-benzonitrile, is filtered and washed with sodium bicarbonate and water. By recrystallization from dimethylformamide, 6.2 g. of the compound which decomposes above 285° C., is obtained.

2.17 g. of the last compound in 50 cc. of dimethylformamide are hydrogenated at room temperature and under atmospheric pressure in the presence of 0.8 g. of 10% palladium on charcoal. The solution filtered off from the catalyst is mixed with 5 cc. of triethylamine and 1.1 g. of 1-methyl-4-nitropyrrole-2-carboxylic acid chloride dissolved in 20 cc. of benzene. Stirring is continued for one night at room temperature and the solution is concentrated in vacuo to one fifth of the original volume. Water is then added until complete precipitation of the product, consisting of p-{1-methyl-4-[1-methy-4-(1-methyl-4-nitropyrrole-2-carboxamido)-pyrrole-2-carboxamido] - pyrrole-2-carboxamido}-benzonitrile, Formula II, $n=2$,

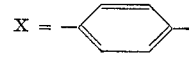

By recrystallization from aqueous dimethylformamide, 2.8 g. of the compound melting at 198–201° C. are obtained.

2.5 g. of this product are suspended in 250 cc. of anhydrous methanol and a current of anhydrous hydrogen chloride is bubbled through at 0° C., until dissolution of the product. After one night at room temperature, the solution is evaporated to dryness and the residue consisting of the corresponding iminoether, Formula III, $n=2$,

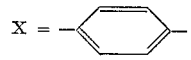

is washed with anhydrous ether, suspended in 150 cc. of anhydrous methanol and saturated at 0° C. with gaseous ammonia. The solution is kept overnight at room temperature, concentrated, and then the product consisting of p-{1-methyl-4-[1-methyl-4-(1-methyl - 4 - nitropyrrole-2-carboxamido) - pyrrole-2-carboxamido]-pyrrole-2-carboxamido}-benzoamidine hydrochloride, Formula IV, $n=2$,

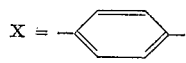

is collected and washed with water and acetone in order to remove the starting material which has not reacted. By recrystallization from methanol 2.1 g. of the compound melting at 230–234° C. are obtained.

0.5 g. of this last product in 60 cc. of 50% acetic acid are hydrogenated at room temperature and under atmospheric pressure in the presence of 0.1 g. of PPtO₂, platinum dioxide, previously reduced in 5 cc. of acetic acid. The solution filtered from the catalyst is then lyophilized. The free base is treated at 0° C. with 5 cc. of mixed anhydride of acetic and formic acid. After one night at 0–5° C., the reaction mixture is poured into anhydrous ether and the precipitate consisting of p-{1-methyl-4-[1-methyl-4-(1-methyl-4-formylamino-pyrrole - 2-carboxamido) - pyrrole-2-carboxamido]-pyrrole-2-carboxamido} benzoamidine hydrochloride is dried (Formula I, n=3,

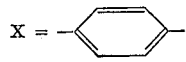

R=CHO). Purification by chromatography through neutral alumina column gives 0.25 g. of the compound, melting at 232° C.

EXAMPLE 2

1 - methyl - 4 - [1 - methyl-4-(1-methyl-4-formylamino-pyrrole-2-carboxamido)-pyrrole-2-carboxamido] - pyrrole-2-carboxamido-acetamidine hydrochloride 18.4 g. 1-methyl-4-nitropyrrole-2-carboxylic acid (J. Am. Chem. Soc. 79, 1957, p. 1266) is added dropwise with 40 cc. of thionyl chloride. When addition is over the reaction mixture is refluxed for one hour. After complete removal of the thionyl chloride in vacuo, the acid chloride is dissolved in 70 cc. of benzene and added under stirring to a solution of 10 g. of amino acetonitrile hydrochloride in 100 cc. of water containing 20 g. of sodium bicarbonate. Stirring is maintained overnight at room temperature, the mixture is then acidified with 1 N hydrochloric acid to remove the excess of amino-aceto-nitrile, filtered, and the precipitate, consisting of 1-methyl-4-nitro-pyrrole-2-carboxamidoacetonitrile, is washed with aqueous sodium bicarbonate solution and then with water. By recrystallization from aqueous ethanol, 19 g. of the product, melting at 188–190° C. are obtained.

8 g. of this product, in 80 cc. of dimethylformamide, are hydrogenated at room temperature and under atmospheric pressure in the presence of 2 g. of 10% palladium on charcoal. The solution filtered off from the catalyst is diluted with water four times, and mixed with an aqueous solution of 4 g. of sodium bicarbonate and with a benzene solution of 1-methyl-4-nitropyrrole-2-carboxylic acid chloride (7.3 g. in 100 cc. of benzene). The mixture is stirred overnight at room temperature and the precipitate consisting of 1-methyl-4-(1-methyl-4-nitropyrrole-2-carboxamido)-pyrrole-2-carboxamidoacetonitrile is filtered off and washed with water. By recrystallization from aqueous dimethylformamide, 7.2 g. of the product, melting at 276–280° C., are obtained.

7.2 g. of this compound are suspended in 250 cc. of absolute ethanol and a current of anhydrous hydrogen chloride is bubbled through until saturation is reached. After one night at 0–5 C., the solution is evaporated to dryness and the residue consisting of the corresponding iminoether is washed with anhydrous ether suspended in 50 cc. of absolute ethanol and saturated at 0° C. with gaseous ammonia. After one night at 0–5° C., the solution is concentrated and the precipitate consisting of 1-methyl - 4-(1-methyl-4-nitropyrrole - 2-carboxamido)-pyrrole-2-carboxamidoacetamidine hydrochloride, is collected. By recrystallization from methanol 7.15 g. of the product which decomposes above 270° C. is obtained.

3.18 g. of this last product dissolved in 100 cc. of acetic acid and 50 cc. of water are hydrogenated at room temperature and under atmospheric pressure in the presence of 0.7 g. of $PtO_2$ previously reduced in 10 cc. of acetic acid. The solution is filtered from the catalyst and lyophilized. The residue, taken up with 15 cc. of dimethylformamide, is mixed with 5 cc. of pyridine and a benzene solution of 1-methyl-4-nitropyrrole-2-carboxylic acid (1.4 g. in 20 cc. of benzene). The mixture is kept under stirring for 36 hours at room temperature; then after removal of the solvents in vacuo, the residue is washed with water, dried and 2.8 g. of 1-methyl-4-[1-methyl-4-(1-methyl-4-nitro-pyrrole-2-carboxamido)pyrrole - 2-carboxamido]-pyrrole-2-carboxamido acetamidine hydrochloride (Formula IV, n=2, X=—$CH_2$—) which may be purified by column chromatography are obtained.

0.5 g. of the product so obtained are dissolved in 15 cc. of acetic acid and 5 cc. of water, hydrogenated at room temperature and under atmospheric pressure in the presence of 0.1 g. of $PtO_2$ previously reduced in 5 cc. of acetic acid. The mixture is separated by filtration from the catalyst and lyophilized. The residue is taken up with methanol and ethyl ether and from this solution 1-methyl-4 - [1-methyl-4-(1-methyl-4-amino-pyrrole - 2 - carboxamido)-pyrrole-2-carboxamido] - pyrrole - 2 - carboxamido acetamidine hydrochloride (Formula I, n=3, X=—$CH_2$—, R=H)

is separated. The free base is treated at 0° C. with 5 cc. of mixed anhydride of formic and acetic acid. After being kept overnight at 0–5° C., the reaction mixture is then poured into anhydrous ether. The precipitate is dried and purified by column chromatography on neutral alumina. 0.3 g. of 1-methyl-4-[1-methyl-4-(1-methyl-4-formylamino-pyrrole-2-carboxamido) - pyrrole-2-carboxamido] - pyrrole-2-carboxamidoacetamidine hydrochloride (Formula I, n=3, X=—$CH_2$—, R=CHO), melting at 198–200° C., are obtained.

This compound is also obtained by hydrogenation of 1-methyl-4-(1-methyl-4-nitro-pyrrole-2-carboxamido)-pyrrole-2-carboxamido acetonitrile (obtained as described by Example 1) and successive condensation with 1-methyl-4-nitro-pyrrole-2-carboxylic acid chloride.

By operating as before described 1-methyl-4-[1-methyl-4-(1-methyl-4-nitro-pyrrole-2-carboxamido) - pyrrole - 2 - carboxamido]-pyrrole-2-carboxamido acetonitrile (Formula II, n=2, X=—$CH_2$—) so obtained is successively converted into the corresponding iminoether (Formula III, n=2, X=—$CH_2$—) and into the corresponding amidine (Formula IV, n=2, X=—$CH_2$), which is hydrogenated (Formula I, n=3, X=—$CH_2$—, R=H) and may be converted into the formylamino derivative (Formula I, n=3, X=—$CH_2$—, R=CHO).

EXAMPLE 3

β-{{1-methyl-4-{1-methyl-4-[1-methyl-4-(1-methyl-4-formylamino-pyrrole - 2 - carboxamido)-pyrrole - 2-carboxamido}pyrrole-2-carboxamido}} - propionamidine hydrochloride 0.5 g. of β-{1-methyl-4-[1-methyl-4(1-methyl-4-nitropyrrole - 2 - carboxamido) - pyrrole - 2-carboxamido]pyrrole-2-carboxamido}-propionitrile (prepared according to the process of our above mentioned copending application No. 384,515) in 10 cc. of dimethylformamide are hydrogenated at room temperature and under atmospheric pressure in the presence of 0.2 g. of 10% palladium on charcoal. The solution filtered from the catalyst is mixed with an aqueous solution of sodium bicarbonate (0.08 g. in 3 cc. of water) and 0.2 g. of 1-methyl-4-nitropyrrole-2-carboxylic acid chloride dissolved in 10 cc. of benzene. The mixture is stirred overnight at room temperature, then diluted with water. The yellow product obtained, which consists of β-{{1-methyl-4-{1-methyl-4-[1 - methyl - 4-(1-methyl-4-nitropyrrole-2-carboxamido)-pyrrole - 2 - carboxamido] - pyrrole-2-carboxamido}-pyrrole-2-carboxamido}}-propionitrile (Formula II, n=3, X=—$(CH_2)_2$—), is washed with a bicarbonate solution and water. By recrystallization from methanol, 0.45 g. of the compound, melting at 240° C., are obtained.

1 g. of this product is suspended in 50 cc. of absolute ethanol and a current of anhydous hydrogen chloride is bubbled therethrough until saturation is reached. The mixture is kept overnight at 0–5° C., evaporated to dryness and the residue consisting of the corresponding iminoether (Formula III, n=3, X=—$(CH_2)_2$—) is washed with anhydrous ether suspended in 50 cc. of absolute ethanol and saturated at 0° C. with gaseous ammonia. After one night at 0–5° C., the solution is concentrated and the product which separates, consisting of β-{{1-methyl-4-{1-methyl-4-[1-methyl-4-(1-methyl-4-nitropyrrole - 2 - carboxamido)-pyrrole-2-carboxamido]-pyrrole - 2 - carboxamido-}pyrrole-2-carboxamido}}-propionamidine hydrochloride (Formula IV, $n=3$, $$X = -(CH_2)_2-)$$

is collected. By recrystallization from ethanol, 0.8 g. of the compound melting at 220–225° C. are obtained.

0.2 g. of the product obtained are dissolved in 20 cc. of acetic acid and 5 cc. of water and hydrogenated at room temperature and under atmospheric pressure in the presence of 50 mg. of $PtO_2$. The solution separated by filtration from the catalyst is lyophilized. The free base is treated at 0° C. with 5 cc. of the mixed anhydride of formic and acetic acid. The mixture is kept overnight at 0–5° C., then it is poured into anhydrous ether. The precipitate, consisting of β-{{1-methyl-4-{1-methyl-4-[1-methyl - 4 - (1 - methyl-4-formylamino-pyrrole-2-carboxamido) - pyrrole - 2 - carboxamido-]pyrrole-2-carboxamido}-pyrrole-2-carboxamido}}-propionamidine hydrochloride (Formula I, $n=4$, $X=-(CH_2)_2-$, R=CHO) is dried. By purification by column chromatography on neutral alumina 0.1 g. of the compound, melting at 213–217° C., are obtained.

EXAMPLE 4

γ - {1 - methyl - 4 - [1-methyl-4(1-methyl-4-formylamino-pyrrole-2-carboxamido)-pyrrole-2 - carboxamido] - pyrrole-2-carboxamido}-butyramidine hydrochloride In the same manner as Example 1 but using as starting material γ-{1-methyl-4-[1-methyl-4-(1-methyl - 4 - nitro-pyrrole - 2 - carboxamido) - pyrrole-2-carboxamido]-pyrrole-2-carboxamido}-butyronitrile (Formula II, $n=2$, $X=-(CH_2)_3-$) the corresponding formylamino butyramidine hydrochloride (Formula I, $n=3$, $$X = -(CH_2)_3-, R = CHO)$$

is obtained.

EXAMPLE 5

ʓ - {1 - methyl - 4 - [1-methyl-4-(1-methyl-4-formylamino-pyrrole-2-carboxamido-)pyrrole - 2 - carboxamido-]pyrrole-2-carboxamido}heptanoylamidine hydrochloride In the same manner as Example 1 but using as starting material ʓ-{1-methyl-4-[1-methyl-4-(1-methyl - 4 - nitro-pyrrole - 2 - carboxamido-)pyrrole-2-carboxamido-]pyrrole-2-carboxamido-}-heptanoylnitrile (Formula II, $n=2$, $X=-(CH_2)_6-$) the corresponding formylamino heptanoylamidine hydrochloride (Formula I, $n=3$, $$X = -(CH_2)_6-$$

R=CHO) is obtained.

EXAMPLE 6 p - {{{1 - methyl - 4-{{1-methyl-4-{1-methyl-4-[1-methyl-4-(1-methyl-4-formylamino - pyrrole - 2-carboxamido-) pyrrole - 2-carboxamido-]pyrrole-2-carboxamido-}pyrrole-2 - carboxamido}} - pyrrole - 2 - carboxamido}}}-benzoamidine hydrochloride In the same manner as Example 1 but using as starting material p-{{{1-methyl-4-{{1-methyl-4-{1-methyl - 4 - [1-methyl - 4 - (1 - methyl-4-nitro-pyrrole-2-carboxamido)-pyrrole-2-carboxamido]-pyrrole - 2 - carboxamido} - pyrrole - 2-carboxamido}}-pyrrole-2-carboxamido}}}-benzonitrile, Formula II, $n=4$,

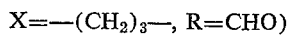

the corresponding formylamino benzoamidine hydrochloride (Formula I, $n=5$,

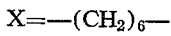

R=CHO) is obtained.

EXAMPLE 7

β - {{{{1-methyl-4-{{{1-methyl-4-{{1-methyl-4-{1-methyl-4 - [1 - methyl - 4-(1-methyl-4-formylamino-pyrrole-2-carboxamido) - pyrrole - 2 - carboxamido] - pyrrole-2-carboxamido}-pyrrole-2 - carboxamido}} - pyrrole - 2-carboxamido}}} - pyrrole-2-carboxamido}}}}-propionamidine hydrochloride In the same manner as Example 1 but using as starting material β-{{{{1-methyl-4-{{{1-methyl-4-{{1-methyl-4-{1-methyl - 4 - [1 - methyl-4-(1-methyl-4-nitro-pyrrole-2-carboxamido)-pyrrole-2-carboxamido] - pyrrole - 2 - carboxamido}pyrrole - 2-carboxamido}} - pyrrole - 2-carboxamido}}}-pyrrole-2-carboxamido}}}}-propionitrile (Formula II, $n=5$, $X=-(CH_2)_2-$) the corresponding formylamino propionamidine hydrochloride (Formula I, $n=6$, $X=-(CH_2)_2-$, R=CHO) is obtained.

EXAMPLE 8

γ - {1 - methyl - 4-[1-methyl-4-(1-methyl-4-formylamino-pyrrole-2-carboxamido)-pyrrole-2 - carboxamido] - pyrrole-2-carboxamido}-butyramidine hydrochloride To a solution of 2 g. of γ-aminobutyronitrile hydrochloride, known in literature (J. Am. Chem. Soc. 81, 1959, 4328) in 50 cc. of water containing 2.6 g. of sodium bicarbonate, 3.2 g. of 1-methyl-4-nitropyrrole-2-carboxylic acid chloride dissolved in 30 cc. of benzole are added. The mixture is stirred overnight at room temperature, then the product consisting of γ-(1-methyl-4-nitropyrrole-2-carboxamido)-butyronitrile is filtered and washed with water. By recrystallization from ethanol 3.6 g. of the compound, melting at 165–166° C., are obtained.

2.3 g. of this compound in 30 cc. of dimethylformamide are hydrogenated at room temperature and under atmospheric pressure in the presence of 1 g. of 10% palladium on charcoal. The solution filtered from the catalyst is diluted about three times with water, mixed with 1.3 g. of sodium bicarbonate and with a benzene solution of 1-methyl-4-nitropyrrole - 2-carboxylic acid chloride (2.1 g. in 50 cc. of benzene). Stirring is maintained overnight at room temperature, the precipitate consisting of γ-[1-methyl-4-(1-methyl-4-nitro-pyrrole-2-carboxamido)-pyrrole - 2-carboxamido]-butyronitrile is filtered and washed with sodium bicarbonate and water. By recrystallization from methanol, 2.4 g. of the compound, melting at 202–204° C., are obtained.

6 g. of the latter product in 30 cc. of dimethylformamide are hydrogenated at room temperature and under atmospheric pressure in the presence of 2.5 g. of 10% palladium on charcoal. The solution filtered off from the catalyst is mixed with 2 g. of sodium bicarbonate dissolved in 100 cc. of water and with 3.6 g. of 1-methyl-4-nitro-pyrrole-2-carboxylic acid chloride dissolved in 50 cc. of benzene. Stirring is kept overnight at room temperature, the precipitate consisting of γ-{1-mehyl-4-[1-methyl - 4-(1-methyl - 4-nitro-pyrrole - 2-carboxamido)-pyrrole - 2-carboxamido]pyrrole-2-carboxamido}-butyronitrile is filtered, washed with sodium bicarbonate and water. By recrystallization from methanol 5.7 g. of the compound, melting at 242–246° C., are obtained.

3 g. of this product are suspended in 50 cc. of absolute ethanol and a current of anhydrous hydrogen chloride is bubbled through until saturation is reached. The solution is kept overnight at 0–5° C., evaporated to dryness and the residue consisting of the corresponding imino-ether is washed with anhydrous ether suspended in 50 cc. of absolute ethanol and saturated at 0° C. with gaseous ammonia. After a night at 0–5° C., the solution is concentrated and the precipitate consisting of γ-{1-methyl-4-[1-methyl - 4-(1-methyl - 4 - nitro-pyrrole - 2-carboxamido)-pyrrole - 2-carboxamido]-pyrrole - 2-carboxamido}-butyroamidine hydrochloride is collected. By recrystallization from ethanol 2.35 g. of the product, melting at 195–197° C., are obtained.

2 g. of this last product, dissolved in 100 cc. of acetic acid and 50 cc. of water are hydrogenated at room temperature and under atmospheric pressure in the presence of 0.5 g. $PtO_2$ previously reduced in 10 cc. of acetic acid. The solution is filtered off from the catalyst and lyophilized. The residue is treated with 10 cc. of mixed anhydride of acetic and formic acid at 0° C. After three hours at room temperature the reaction mixture is poured into anhydrous ether. The precipitate, consisting of γ-{1-methyl-4-[1-methyl - 4-(1-methyl - 4-formylaminopyrrole-2-carboxamido)-pyrrole - 2-carboxamido]-pyrrole - 2-carboxamido}-butyroamidine hydrochloride is dried and purified by column chromatography on activated magnesium silicate. By recrystallization from aqueous dilute hydrochloric acid 1.2 g. of the product, melting at 205–210° C., are obtained.

We claim:

1. A compound selected from the group consisting of 1-methyl - 4-[1-methyl - 4-(1-methyl - 4-formyl-amino-pyrrole - 2-carboxamido) - pyrrole - 2 -carboxamido]-pyrrole - 2-carboxamidoacetamidine and its non-toxic acid addition salts with an acid selected from the group consisting of hydrochloric, sulphuric, phosphoric, acetic, maleic, ascorbic, succinic, benzoic and salicylic.

2. A compound selected from the group consisting of p-{1-methyl - 4-[1-methyl-4-(1-methyl - 4-formyl-amino-pyrrole - 2 - carboxamido) - pyrrole - 2 - carboxamido]-pyrrole - 2-carboxamido}-benzoamidine and its non-toxic acid addition salts with an acid selected from the group consisting of hydrochloric, sulphuric, phosphoric, acetic, maleic, ascorbic, succinic, benzoic and salicylic.

3. A compound selected from the group consisting of β-{{1-methyl - 4-{1-methyl - 4-[1-methyl - 4(1-methyl-4-formylamino-pyrrole - 2-carboxamido)-pyrrole - 2-carboxamido]-pyrrole - 2-carboxamido}-pyrrole - 2-carboxamido}}-propionamidine and its non-toxic acid addition salts with an acid selected from the group consisting of hydrochloric, sulphuric, phosphoric, acetic, maleic, ascorbic, succinic, benzoic and salicylic.

4. A compound selected from the group consisting of γ-{1-methyl - 4-[1-methyl - 4-(1-methyl - 4-formylamino-pyrrole - 2 - carboxamido)-pyrrole - 2 - carboxamido]-pyrrole - 2-carboxamido}-butyramidine and its non-toxic acid addition salts with an acid selected from the group consisting of hydrochloric, sulphuric, phosphoric, acetic, maleic, ascorbic, succinic, benzoic and salicylic.

5. A compound selected from the group consisting of ξ-{1-methyl - 4-[1-methyl - 4-(1-methyl - 4-formylamino-pyrrole - 2 - carboxamido)-pyrrole - 2 - carboxamido]-pyrrole - 2-carboxamido}-heptanoylamidine and its non-toxic acid addition salts with an acid selected from the group consisting of hydrochloric, sulphuric, phosphoric, acetic, maleic, ascorbic, succinic, benzoic and salicylic.

6. A compound selected from the group consisting of p-{{{1-methyl - 4-{{1-methyl - 4-{1-methyl - 4-[1-methyl-4-(1-methyl-4-formylamino - pyrrole - 2 - carboxamido)-pyrrole-2-carboxamido] - pyrrole - 2 - carboxamido}-pyrrole-2-carboxamido}}-pyrrole-2-carboxamido}}} - benzoamidine and its non-toxic acid addition salts with an acid selected from the group consisting of hydrochloric, sulphuric, phosphoric, acetic, maleic, ascorbic, succinic, benzoic and salicylic.

7. A compound selected from the group consisting of β-{{{{1-methyl - 4-{{{1-methyl - 4-{{1 - methyl - 4-{1-methyl - 4-[1-methyl - 4 - (1-methyl - 4 - formylamino-pyrrole - 2 - carboxamido) - pyrrole - 2 - carboxamido]-pyrrole - 2 - carboxamido}-pyrrole - 2 - carboxamido}}-pyrrole - 2-carboxamido}}}-pyrrole - 2-carboxamido}}}}-propionamidine and its non-toxic acid addition salts with an acid selected from the group consisting of hydrochloric, sulphuric, phosphoric, acetic, maleic, ascorbic, succinic, benzoic and salicylic.

References Cited

Kenner et al.: J. Chem. Soc., 1943, pp. 574–5.

Noller: Chemistry of Organic Compounds, p. 262, (1957).

Sidwick: Organic Chemistry of Nitrogen, pp. 154–55, (1937).

ALEX MAZEL, Primary Examiner.

J. A. NARCAVAGE, Assistant Examiner.

U.S. Cl. X.R.

424—200, 232, 274